May 20, 1969   J. G. HOAD   3,445,007
MATERIAL HANDLING APPARATUS
Filed Dec. 16, 1966   Sheet 1 of 2

INVENTOR
JOHN G. HOAD

BY Olsen and Stephenson
ATTORNEYS

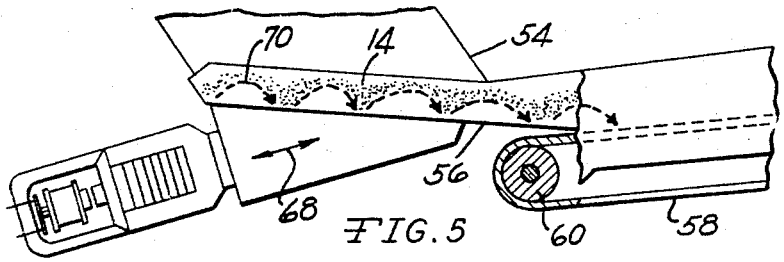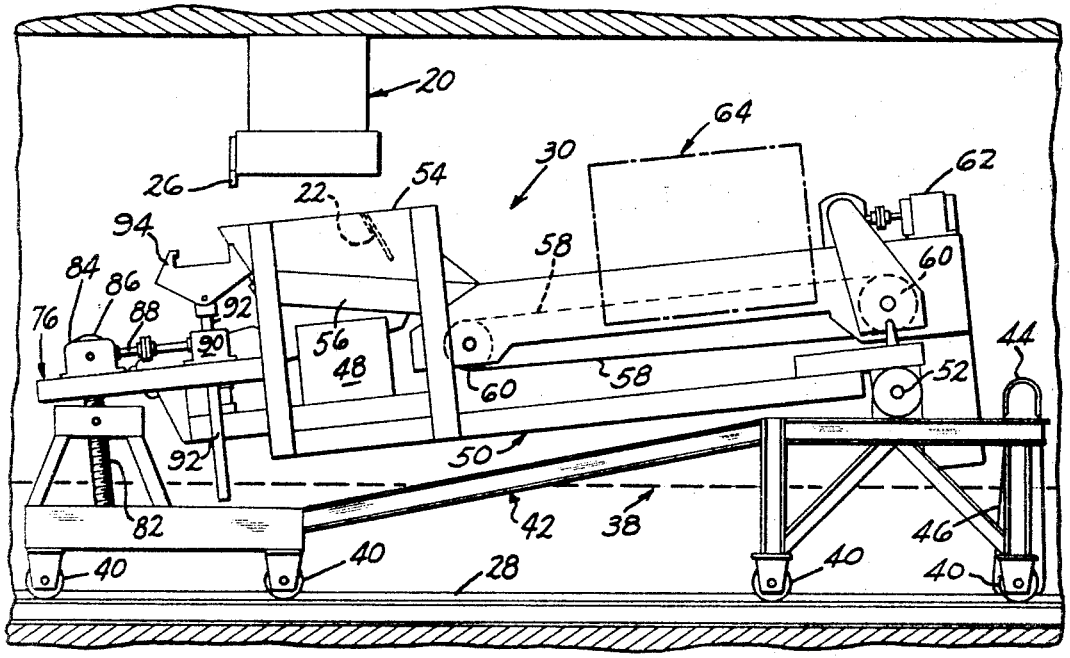

United States Patent Office 3,445,007
Patented May 20, 1969

3,445,007
MATERIAL HANDLING APPARATUS
John G. Hoad, Dearborn, Mich., assignor to John G. Hoad & Associates, Inc., Ypsilanti, Mich., a corporation of Michigan
Filed Dec. 16, 1966, Ser. No. 602,329
Int. Cl. B65g 65/42, 67/14, 37/00
U.S. Cl. 214—10
9 Claims

ABSTRACT OF THE DISCLOSURE

Apparatus for reclaiming bulk material from a storage building surface, a storage pile or the like. The apparatus includes a tube for positioning under the bulk material through which a conveyor extends, and rail means are provided lengthwise in the tube on which a mobile unit is movable for positioning under gate means for receiving bulk material. The mobile unit is operable to open the gate means and to transfer bulk material received through the gate opening onto the conveyor.

---

The present invention relates to material handling apparatus, and more particularly to apparatus for reclaiming bulk material from a storage building surface, a storage pile, or the like.

It is conventional practice to store bulk material in large silos and similar buildings of relatively high cost which require relatively high cost loading and unloading or reclaiming apparatus. One of the most economical arrangements for storing such materials comprises using a roof structure to overlie a surface on which the bulk material can be piled. For this purpose an A-frame roof is very satisfactory, and such an arrangement facilitates piling of the material on the surface. However, one of the problems then arising is that of reclaiming the material in a simple and efficient manner.

Accordingly, it is one of the objects of the present invention to provide improved material handling apparatus for reclaiming bulk material from a storage building or surface.

It is another object of the present invention to provide an improved material handling apparatus of the foregoing character which is constructed and arranged so that it can also be utilized for reclaiming measured amounts of the material and which can also be used to blend two or more different materials or to remove different materials selectively from a storage building, as directed by a signal from a remote source.

It is still another object of the present invention to provide improved material handling apparatus of the foregoing character which is characterized by its low operational and maintenance costs.

It is still another object of the present invention to provide improved material handling apparatus of the foregoing character which is constructed and arranged so that it can readily be operated automatically so as to substantially eliminate labor costs in connection with reclaiming material.

According to one form of the present invention, material handling apparatus is provided comprising a tube adapted to be positioned in a generally horizontal position below a storage pile of bulk material and having at least one opening in an upper wall portion thereof for receiving the bulk material. Gate means for the opening are provided which normally are in a closed position and are responsive to an applied force to maintain an open position. An endless conveyor extends through the tube for carrying bulk material out of the tube. Rails also extend lengthwise in the tube and a mobile unit is movable on the rails to a position under the gate means. The mobile unit comprises a carriage movable on the rails, and a frame pivotally mounted on the carriage for elevation of one end of the frame, said frame supporting at said one end a chute and a gate actuating mechanism for exerting a force on said gate means for opening the same. The chute and the gate actuating mechanism are oriented so that when one end of the frame is elevated to permit the gate actuating mechanism to open the gate means, the chute will be properly positioned under the gate means to receive bulk material discharged therethrough. A lift mechanism is located on the carriage and is operable to raise and to lower the one end of the frame, and a transfer mechanism with or without a means of continuous weighing is provided for transferring bulk material from the chute to the endless conveyor.

In this form of the invention the lift mechanism is operably connected to the gate actuating mechanism for elevating the gate actuating mechanism relative to the frame simultaneously when the lift mechanism elevates the frame. This is accomplished by a gear train, or other suitable means may be employed which operably connects the lift mechanism with the gate actuating mechanism. The material handling apparatus also has a transfer mechanism which includes a vibrating feeder for advancing the material from the chute to the weigh belt which is adapted to weigh the material being discharged there-across and to transfer such material to the endless conveyor belt extending lengthwise in the tube.

The material handling apparatus employs an electrical power pickup track to which the mobile unit is connected so that a source of electrical power is available to operate electric motors for driving the mobile unit as well as the movable components forming parts of the mobile unit.

Other objects of this invention will appear in the following description and appended claims, reference being had to the accompanying drawings forming a part of this specification wherein like reference characters designate corresponding parts in the several views.

In the drawings:

FIGURE 3 is a view similar to that of FIGURE 2, showing the mobile unit in position under a gate means but with the gate means closed;

FIGURE 4 is an enlarged fragmentary view of a portion of the mechanism for lifting the pivotal frame member of the mobile unit; and FIGURE 5 is a schematic enlarged sectional view illustrating portions of the transfer mechanism of the mobile unit.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
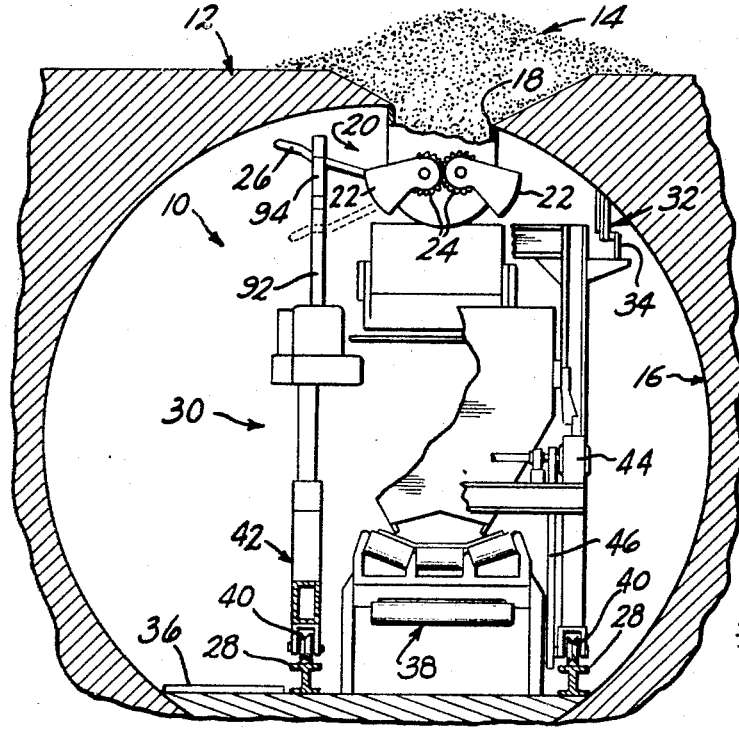
FIGURE 1 is a fragmentary front elevational view of one form of the present invention, illustrating a mobile unit is a tube located below a surface on which bulk material is stored.
Figure 2:
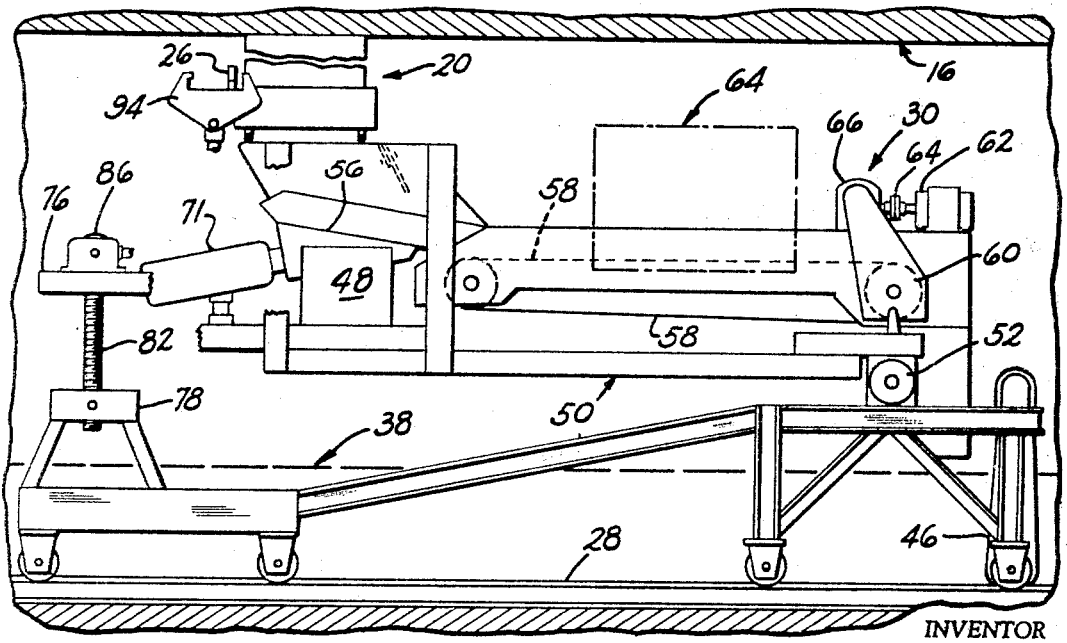
FIGURE 2 is a fragmentary side elevational view of the mobile unit illustrated in FIGURE 1, showing the unit in an operative position for receiving and reclaiming bulk material.

Referring now to the drawings, the invention will be described in greater detail. The material handling apparatus 10 is shown in FIGURES 1, 2 and 3 as extending below a surface 12 on which is stored bulk material 14. The material handling apparatus 10 includes a tunnel or tube 16 which can be of any desired length. A plurality of openings 18 (only one being shown) are located in the upper wall of the tube 16 and are positioned at selected distances apart along the tube. Positioned under each of the openings 18 is a gate means 20 for normally maintaining the openings in a closed position. Each gate means 20 has two pivotally mounted shutters 22 which are connected together by gears 24 so that when the gate lever 26, which is connected to one of the shutters 22, is pivoted to the elevated position shown in FIGURE 1, the other gate shutter 22 will be pivoted to the same extent. Likewise, when the lever 26 is released so that it descends to the position shown in FIGURE 3, the gate shutters 22 will be pivoted to closed positions so as to close the opening 18. As will be understood by those skilled in the art, with some materials it may be necessary to weight the lever 26 to assure closure, or the gate lift mechanism, to be described, may be so designed as to pull down the lever 26 when the lift mechanism is retracted. Such changes can be made without departing from the scope of the present invention.

Also extending lengthwise through the tunnel or tube 16 are a pair of rails 28 on which a mobile unit 30 is adapted to travel. An electric power source or rail 32 also extends lengthwise of the tunnel or tube 16 for engagement by an electrical power pickup means 34 which is a part of the mobile unit 30. A service walk way 36 extends the length of the tunnel and is positioned on one side of the tracks 28 so that operators and maintenance men may travel through the tube 16, when desired. Located between the tracks 28 is a conventional endless conveyor 38 which is adapted to carry bulk material deposited thereon to one end of the tube 16. In view of the fact that this is a conventional endless conveyor mechanism the details thereof will not be described and it is shown only schematically by broken lines in FIGURES 2 and 3.

The mobile unit 30 is movable on the tracks 28 by means of a plurality of wheels 40 which are secured to the carriage 42, and electric motor 44 is mounted on the forward end of the carriage 42 and employs a conventional drive 46 for driving the front set of wheels 40. The electric motor 44 is suitably connected to the electrical power pickup means 34 through an electrical control panel 48 by conventional conductors, not shown.

Mounted on the carriage 42 is a frame 50 which is supported at its forward end on the pivot 52 so that the rearward end of the frame can be raised and lowered in a manner to be described. At the rearward end of the frame 50 is a chute 54 which is rigidly secured to the frame 50 and has a conveyor deck 56 which is movable relative to the upper portion of the chute 54. In FIGURE 5 it can be seen that the forward end of the chute has an opening through which the bulk material 14 can be discharged onto a weigh belt 58 which is carried on the rotatable rollers 60 which in turn are supported on the frame 50. The weigh belt 58 is arranged so that when rotated it is adapted to discharge bulk material onto the endless conveyor 38. The weigh belt 58 is moved by means of the electric motor 62 which is mounted on the forward end of the frame 50, and the motor 62 is connected by means of the drive shaft 64 and gear box 68 to a drive belt, not shown, for turning the forward roller 60.

A conventional weighing mechanism 64 is mounted on the frame 58 for weighing the material that is passed over the belt 60. The weighing mechanism 64 is shown in broken lines since any such mechanism of conventional construction may be employed. One such device is sold under the trade name "Feedoweight" manufactured by Merrick Scale Manufacturing Company located in Passaic, N.J.

It is also contemplated that a vibrating feeder mechanism will be employed in conjunction with the feeder deck 56 for moving the bulk material from the chute 54 to the conveyor belt 58. For this purpose a power unit 71 is attached to one of the members of the frame 50 at a slight angle of approximately 20° with respect to the conveyor deck 56. In the operation of the vibrating feeder, as the deck 56 moves forward, it also moves upward at the 20° angle and as it moves backward, it descends at the same angle. Material on the deck is lifted forward and upward. However, the material being free to move, it does not return with the backward movement of the deck but falls under the slower force of gravity until it is intercepted by the next forward and upward stroke. The movement of the power unit causes the deck to move in the direction of the indicator arrow 68, FIGURE 5, and the bulk material is caused to move in increments as shown by the plurality of broken indicator arrows 70. Thus, while in appearance the movement of the material is that of a uniform flowing stream, it is, in reality, comprised of a continuous series of short, forward hops which are generally imperceptible to the eye.

Thus, the mobile unit 30 includes a transfer mechanism which comprises the chute 54, the vibrating feeder 71, and the weigh belt and its associated parts. Also forming a part of the chute 54 is the adjustable flow control vane or gate 72 which may also be used to aid in controlling the rate of feed of the bulk material onto the endless conveyor belt 38. The entire mobile unit 30 with its transfer mechanism will be controlled automatically from a remote signal generated by a subsequent process control variable or a manual set point. When proportioning, two or more units 30 would be positioned to two or more correct gate means 20 automatically as directed by the subsequent process control system, and likewise, the weighing belt 58 will control the vibrating feeder 71 so as to place material on the endless conveyor belt 38 at the proper rate.

Supported on the rear of the carriage 42 is a lift mechanism 76 for pivotally lifting the rearward end of the frame 50 from the depressed position shown in FIGURE 3 to the elevated position shown in FIGURE 2 to the depressed position of FIGURE 3.

The lift mechanism 76 includes a rigid base portion 78 in which a pivotally mounted ring 80 is carried. The ring 80 is internally threaded to receive the jack screw 82. Supported on the frame 50 is a gear box 84 through which the jack screw 82 extends and which is adapted to rotate the jack screw 82 for elevating and lowering the frame 50 with respect to the base member 78. The details of the gearing are not shown since they are conventional in construction and such gearing is driven by the electric motor 86 which can be seen in FIGURES 2 and 3. From this arrangement it will be understood that when the motor 86 is energized it will turn the gear train in the gear housing 84 so as to turn the jack screw 82 in either direction for raising or lowering the rearward end of frame 50 with respect to the carriage 42.

Also driven from the gear box 84 is the drive shaft assembly 86 which is connected to a second gear box 90 in which is a conventional pinion gear, not shown, which is in mesh with the rack 92 so that when the gear, not shown, is rotated, the rack 92 will be raised or lowered. Connected to the upper end of the rack 92 are the jaws or upper end of the gate actuating mechanism 94 which are adapted to engage the gate lever 26 for raising it to the open position shown in FIGURES 2 and 1. Thus, it can be seen that when the electric motor 86 causes jack screw 82 to turn for elevating the rear end of the frame 50, the gate actuator mechanism 94 will be raised therewith, and in addition, the gate actuating mechanism 94 will be moved upwardly relative to frame 50. By virtue of this arrangement the mobile unit 30 can be moved under any of the normally closed gate means 20 and when the frame member 50 is raised to the elevated position shown in FIGURE 2, the gate actuating mechanism will be elevated so as to apply a force in an upward direction against the gate lever 26 to open the gate shutters 22, thereby allowing material to be discharged at controlled rates through the transfer mechanism onto the continuously turning conveyor belt 38. When it is desired to move the mobile unit 30 to another gate means 20, the frame 50 will again be lowered to the position shown in FIGURE 3, and the mobile unit 30 will then be moved by means of its propulsion motor 62 to the new location. By virtue of this arrangement controlled amounts of material can be fed from the gate means 20 to the belt 38, and if desired, a plurality of the mobile units 30 may be used simultaneously with a plurality of gate means 20 with each of the units 30 being located under a different one of the gate means 20. Different types of bulk material can be stored above certain of the gate means 20 so that each of the mobile units 30 can feed controlled amounts of different materials onto the continuous conveyor 38 thereby blending or mixing such materials in proportioned amounts. Thus, by virtue of the present invention, a most effective operation can be carried on for reclaiming and/or blending bulk materials.

Having thus described my invention, I claim:

1. Material handling apparatus comprising a tube adapted to be positioned in a generally horizontal position below a storage pile of bulk material and having at least one opening in an upper wall portion thereof for receiving bulk material, gate means for said opening normally maintaining a closed position and responsive to an applied force to maintain an open position, an endless conveyor extending lengthwise in said tube for conveying bulk material out of the tube, rails extending lengthwise in said tube, and a mobile unit movable on said rails to a position under said gate means, said mobile unit comprising a carriage movable on said rails, a frame pivotally mounted on the carriage for elevation of one end of the frame, said frame supporting at said one end a chute and a gate actuating mechanism for exerting a force on said gate means for opening the same, said chute and said gate actuating mechanism being oriented so that when said one end of the frame is elevated to permit the gate actuating mechanism to open the gate means the chute will be positioned under said gate means to receive bulk material discharged therethrough, a lift mechanism on said carriage operable to raise and to lower said one end of the frame, and a transfer mechanism for transferring bulk material from said chute to said endless conveyor.

2. Material handling apparatus according to claim 1, wherein said lift mechanism is operably connected to said gate actuating mechanism for elevating said gate actuating mechanism relative to said frame.

3. Material handling apparatus according to claim 2, wherein said lift mechanism and said gate actuating mechanism are synchronized in operation by a connecting gear train.

4. Material handling apparatus according to claim 1, wherein said transfer mechanism includes a vibrating feeder.

5. Material handling apparatus according to claim 1, wherein said transfer mechanism includes a weigh belt.

6. Material handling apparatus according to claim 1, wherein said transfer mechanism includes a weigh belt for discharging material onto said endless conveyor, and a vibrating feeder for transferring the material from said chute onto said weigh belt.

7. Material handling apparatus according to claim 1, wherein said tube contains an electrical power pickup track, and said mobile unit includes a propulsion drive motor electrically connected to said pickup track for moving said mobile unit on said rails.

8. Material handling apparatus according to claim 1, wherein said tube contains an electrical power pickup track, and said mobile unit includes a lift mechanism drive motor electrically connected to said pickup track, said lift mechanism and said gate actuating mechanism being connected by a gear train for synchronized operation in response to operation of said lift mechanism drive motor.

9. Material handling apparatus comprising a tube adapted to be positioned in a generally horizontal position below a storage pile of bulk material and having at least one opening in an upper wall portion thereof for receiving bulk material, gate means for said opening normally maintaining a closed position and responsive to an applied force to maintain an open position, an endless conveyor extending lengthwise in said tube for conveying bulk material out of the tube, rails extending lengthwise in said tube, and a mobile unit movable on said rails to a position under said gate means, said mobile unit comprising a carriage movable on said rails, a frame mounted on the carriage for elevation relative thereto, said frame supporting a chute and a gate actuating mechanism for exerting a force on said gate means for opening the same, said chute and said gate actuating mechanism being oriented so that when said frame is elevated to permit the gate actuating mechanism to open the gate means the chute will be elevated to a position under said gate means to receive bulk material discharged therethrough, a lift mechanism on said carriage operable to raise and to lower said frame, and a transfer mechanism for transferring bulk material from said chute to said endless conveyor.

References Cited

UNITED STATES PATENTS

| 1,727,172 | 9/1929 | McIntyre | 214—41 |
| 2,288,764 | 7/1942 | Winship et al. | |
| 2,766,002 | 10/1956 | Banks | 214—17 XR |

GERALD M. FORLENZA, *Primary Examiner.*

FRANK E. WERNER, *Assistant Examiner.*

U.S. Cl. X.R.

198—89; 214—17, 41